(12) United States Patent
Sarradin

(10) Patent No.: US 6,847,816 B1
(45) Date of Patent: Jan. 25, 2005

(54) METHOD FOR MAKING A PAYMENT SECURE

(75) Inventor: Jean-Louis Sarradin, Fontenay en Parisis (FR)

(73) Assignee: Sagem, SA, Paris (FR)

( * ) Notice: Subject to any disclaimer, the term of this patent is extended or adjusted under 35 U.S.C. 154(b) by 0 days.

(21) Appl. No.: 09/714,775

(22) Filed: Nov. 16, 2000

(51) Int. Cl.$^7$ .................................................. H04M 11/00
(52) U.S. Cl. ................ 455/407; 455/406; 455/414.1; 455/558; 705/16; 705/26; 705/40; 235/380
(58) Field of Search .......................... 455/406, 407, 455/408, 410, 411, 414.1, 418, 558; 235/380; 705/16, 64, 26, 40, 76, 411, 21, 235, 380, 381

(56) References Cited

U.S. PATENT DOCUMENTS

| | | | | |
|---|---|---|---|---|
| 5,127,040 A | * | 6/1992 | D'Avello et al. ............ | 455/419 |
| 5,754,655 A | * | 5/1998 | Hughes et al. ............... | 705/70 |
| 6,142,369 A | * | 11/2000 | Jonstromer ................. | 235/380 |
| 6,386,450 B1 | * | 5/2002 | Ogasawara ................. | 235/383 |
| 6,418,326 B1 | * | 7/2002 | Heinonen et al. ........... | 455/558 |
| 6,424,845 B1 | * | 7/2002 | Emmoft et al. ........... | 455/575.1 |
| 6,430,407 B1 | * | 8/2002 | Turtiainen ................. | 455/411 |
| 6,439,456 B1 | * | 8/2002 | Bansal et al. ............... | 235/379 |
| 6,442,532 B1 | * | 8/2002 | Kawan ........................ | 705/35 |
| 6,456,984 B1 | * | 9/2002 | Demoff et al. ................ | 705/40 |
| 6,535,726 B1 | * | 3/2003 | Johnson ...................... | 455/406 |
| 6,542,872 B1 | * | 4/2003 | Skubic et al. ................. | 705/16 |
| 6,556,680 B1 | * | 4/2003 | Leonardi ..................... | 380/247 |
| 6,556,692 B1 | * | 4/2003 | Gavrila ....................... | 382/104 |
| 6,584,309 B1 | * | 6/2003 | Whigham .................... | 455/407 |
| 2002/0025796 A1 | * | 2/2002 | Taylor et al. ............... | 455/406 |
| 2002/0123965 A1 | * | 9/2002 | Phillips ....................... | 705/41 |

FOREIGN PATENT DOCUMENTS

| | | | | |
|---|---|---|---|---|
| DE | 295 20 925 | | 10/1996 | |
| EP | 0 785 534 | | 7/1997 | |
| EP | 0785534 A1 | * | 7/1997 | ............ G07F/7/10 |
| WO | WO 97/18653 | | 5/1997 | |
| WO | WO 98/06214 | | 2/1998 | |
| WO | WO 98/42173 | | 10/1998 | |
| WO | WO 0038443 | * | 6/2000 | ............ H04Q/7/22 |

* cited by examiner

Primary Examiner—Charles Appiah
Assistant Examiner—Khawar Iqbal
(74) Attorney, Agent, or Firm—Patterson, Thuente, Skaar & Christensen, P.A.

(57) ABSTRACT

A mobile telephone is equipped with a smart-card reader to aid in universal payment by smart card. A security checking circuit of the mobile telephone is provided with a complementary function by which the mobile telephone can behave like a secured smart-card reader with a view to payment. Smart-card payments are facilitated by disassociating an act of payment from an act of purchase which can be done by any means, in particular through the internet.

12 Claims, 4 Drawing Sheets

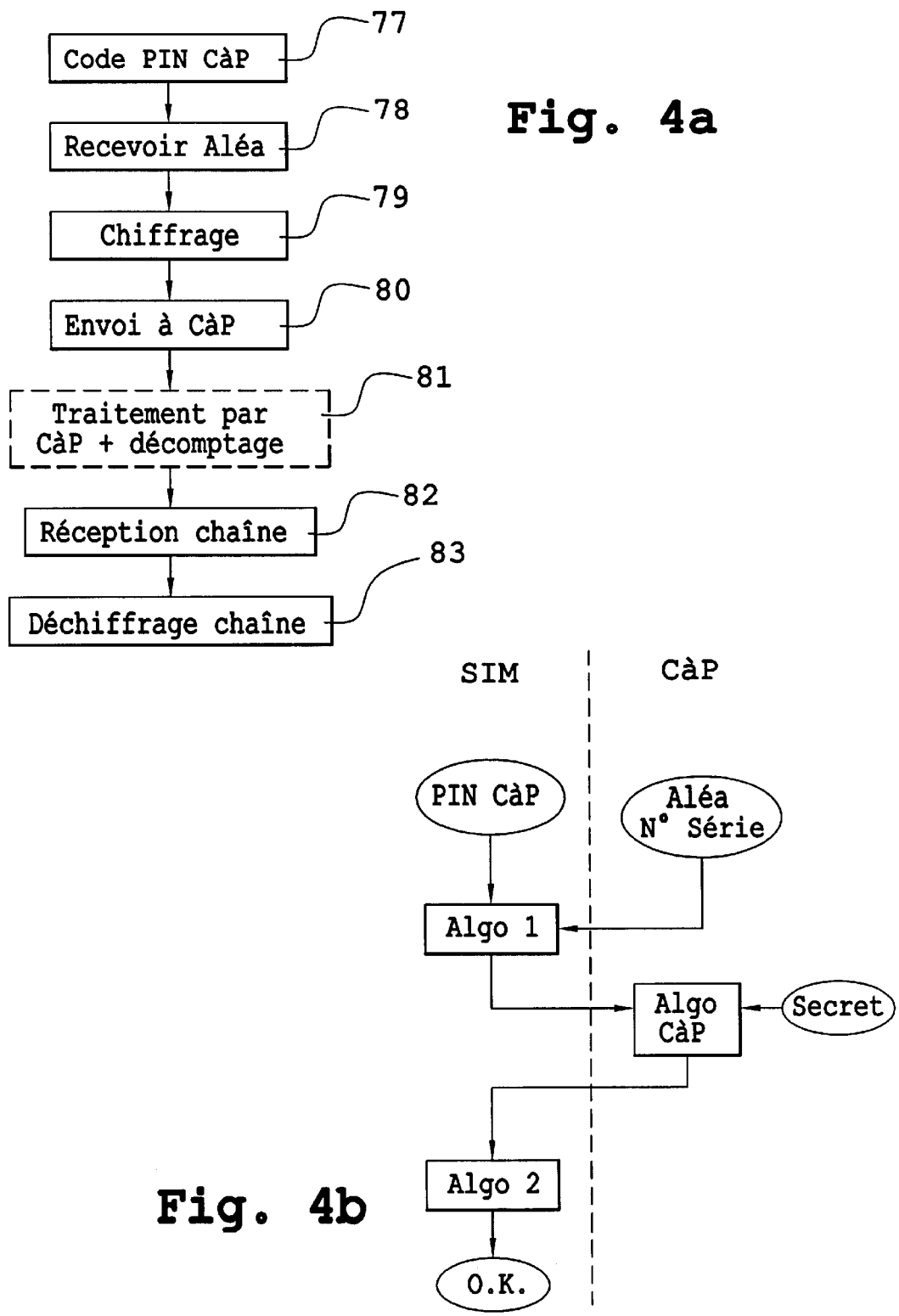

METHOD FOR MAKING A PAYMENT SECURE

BACKGROUND OF THE INVENTION

1. Field of the Invention

An object of the present invention is a method of secured payment. In the invention, this payment will be done by means of a smart card in keeping for example with bank security protocols. A banking method of this kind has all the guarantees of resistance to fraud. It is furthermore accepted by the entire banking profession. The aim of the invention is to further the use of this type of payment because it is more reliable in the field of business transactions.

2. Description of the Prior Art

The prerequisite to a payment is a commercial transaction. A transaction of this kind essentially comprises the definition of references of an article to be acquired or a service to have performed and the communication of the corresponding price. The customer in paying the price obtains, in return, the article or service. In a smart-card payment, the references of the transaction are communicated to a payment terminal which prepares a payment message. This payment message comprises the designation of the article or service and the price to be paid. It furthermore comprises information such as the date and time of the transaction. The payment message also comprises the designation of the tradesman's bank references. These bank references are used for the transfer, to the tradesman's bank account, of the sum paid to him. The only information that is strictly essential in such a payment message is the price and the tradesman's bank references as well as those of the paying party or payer.

The payment message includes a final argument which is the designation of the customer's bank account and his agreement to the payment of the price. The bank account designation is obtained by the insertion of a smart card of the customer into the tradesman's terminal, which is also a smart-card reader. The signalling of the customer's assent is a complex operation. Indeed, however easy it may be for the customer to give his assent to the payment of the price, it is equally necessary for the tradesman to be sure firstly that the smart card inserted into his terminal is an authorized smart card and secondly that the holder of this smart card is truly its legal holder.

The first operation is performed during an authentication operation. In this context, the terminal exchanges information with the smart card to ascertain that the smart card is not a falsified smart card. In a second stage, the smart card performs a verification to ascertain that the bearer is the legal bearer. In the second operation which, if necessary, may be placed before the first one, the bearer of the card keys in a PIN (personal identification number) identification code on the terminal keyboard. The smart card uses this PIN to ascertain that is being used in a normal way. In a third stage, it is also possible for the smart card to authenticate the reader, i.e. to ascertain that it is an authorized reader. The authentication of the reader by the smart card is of the same type as the authentication of the smart card by the reader.

In carrying out this operation, by keying in his PIN code, the bearer performs two operations. A first operation, as stated here above, consists in showing that he is the true holder of the smart card. Secondly, the fact of keying in the right PIN code is legally considered to be an agreement to make payment.

Once these operations are performed, the payment message is constituted in its entirety. The payment message explicitly or implicitly comprises the following information: the tradesman's bank account number, the amount of the transaction, the customer's bank account number. It may comprise other pieces of information such as the date of the transaction, the nature of the transaction as well as an operation number giving an indication, for the terminal, of the number of operations processed during the day up to this last operation. This payment message is then sent in a telephone call, generally at night, to a payment center. In the payment center, the payment is made. The payment message is converted into a payment.

In certain cases, given the large amounts involved in the transactions, the payment message has to be authorized by a prior authorization from the payment center. In this case, a real-time connection is set up at the payment center during the period when the customer has keyed in his PIN code. During this connection, the amount available in the customer's account is verified or can be verified and can furthermore be reserved for payment of the concerned transaction. During these night telephone calls, or else these random calls requesting authorization, the memory of the payment terminal is updated with the communication of the numbers of blacklisted smart cards to this terminal. These cards may be blacklisted for example because their true owner has stopped their validity on detecting their theft.

This very complicated procedure therefore requires the distribution to tradesmen of a substantial set of means, payment terminals and regular telephone links. This distribution is a fairly lengthy operation. Consequently, certain tradesmen may lack such equipment. Furthermore, in certain cases, the payment cannot be made by smart card because, quite simply, the vending party is not a tradesman. For example, an ordinary private individual cannot obtain payment by smart card (with all the security entailed therein) for the sale of an article or service of any kind. In another field, that of mail-order sales, the tradesman himself is not physically present and even less so are his payment devices.

In an earlier French patent application FR 98 08717 filed on 3 Jul. 1998, a method was devised for making a third party, in this case a mobile telephony operator, carry out some of the operations referred to here above which are performed for example by a conventional payment terminal. This type of operation may entail the drawback, for the mobile telephony operator, of making him a party to the transaction. This service is no longer limited to the simple conveyance of speech data or computer data but to the performance of certain operations of verification, certification or authentication in which his responsibility is involved. Furthermore, by acting in this way, the fact that there are numerous mobile telephony operators means that he has to conclude contracts with each of them and, when the payment operation is launched, it means that the paying party has to choose the operator with whom the transaction will be made. The method described in this patent application furthermore leads to the need for the duplicating, in a control circuit of the mobile telephone, of secret type data elements of a bank smart card. A procedure of this kind may come provoke hesitation and reluctance.

In the present invention, this problem has been resolved by using a mobile telephone carried by a customer and provided, firstly, with a security control circuit, for example of the SIM (secure identification module) type and, secondly, an associated smart-card reader. The fact that the mobile telephone is held by the client does not means that the customer is necessarily its owner. It only means that the mobile telephone has been made available to this client at least temporarily for the payment phase.

Then, at the time of the transaction, a prepayment message is caused to be sent to a payment center. Instead of the customer's bank particulars and the result of the authentication and of the checking of his bearer code and instead of the procurement of his assent, the prepayment message sent by the tradesman comprises the mobile telephone number of the using customer.

Thus, the payment center makes contact, of its own accord and on its own responsibility, with this mobile telephone. When the link is set up, the mobile telephone obtains the execution, by the SIM security circuit, of the verification protocol normally performed by a payment terminal. As an alternative, the mobile telephone itself comprises a secure program to carry out this protocol. This secured program is not necessarily loaded or executed in the SIM circuit. Through this mode of action, the mobile telephone, during the telephone session, becomes a smart-card electronic payment terminal for a single specified operation. The invention then has the particular feature wherein the regular and unexpected updating of the temporary payment terminal thus constituted can be done in a simple way. Instead of sending a list of blacklisted smart cards, during the call, the mobile telephone sends the number of the smart card that is inserted into its reader. If this card is authorized, the sequence of normal operations of the terminal is undertaken by the smart-card reader of the mobile telephone.

SUMMARY OF THE INVENTION

An object of the invention therefore is a method of payment comprising the following steps:

the characteristics of a commercial transaction between a vendor and a user of a mobile telephone are defined, the mobile telephone of the user is provided with a smart-card reader interface, a request for payment, a call number of the mobile telephone of the customer and characteristics of the transaction are transmitted to a payment center through a terminal of the vendor, the payment center calls the mobile telephone, when the connection is set up, the payment center makes the mobile telephone execute a payment session, during the payment session, the mobile telephone launches a secured payment procedure with a smart card of the customer inserted into the smart-card reader of the mobile telephone.

BRIEF DESCRIPTION OF THE DRAWINGS

The invention will be understood more clearly from the following description and the appended figures. These figures are given purely by way of an indication and in no way restrict the scope of the invention. Of these figures:

FIGS. 4a and 4b show exemplary operations of authentication, certification or checking of the card bearer implemented between the SIM circuit and the smart card, simulating the operations performed by a known type of payment terminal.

MORE DETAILED DESCRIPTION

Figure 1:
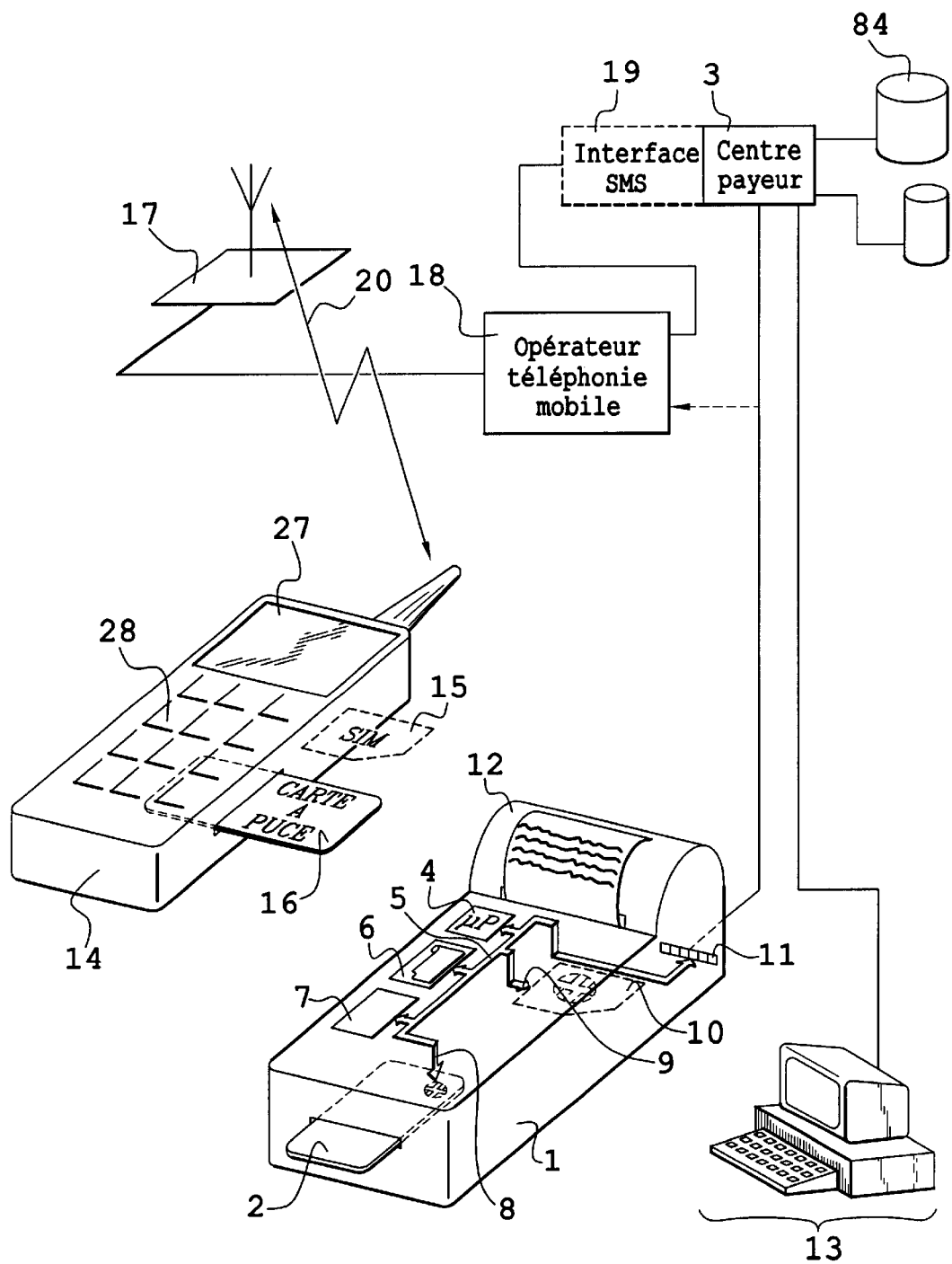
FIG. 1 gives a schematic view of the means that can be used to implement the method of the invention.

FIG. 1 shows all the essential means needed for the efficient performance of the method of the invention. In a tradesman's establishment, conventionally, a payment terminal 1 is available. The terminal 1 is capable of getting linked up firstly with a smart card 2 of a customer and secondly with a payment center 3 to which a payment message is sent as seen here above. The terminal 1 essentially has a microprocessor 4 connected by an address, control and data bus 5 to a program memory 6 and to a working and data memory 7. The bus 5 is also connected to a peripheral connector 8 for the reading of the smart card 2 and an interface 11 for communication with the payment center 3. In one variant, this bus 5 is connected to a connector 9 for reading a securing circuit 10 of the terminal 1. In a known way, the terminal 1 may comprise a keyboard and a screen as well as a printer 12 to print a mini-invoice on the transaction and the payment made. These edition peripherals are also connected to the bus 5. The interface 11 generally comprises a modem so that the link of the terminal 1 to the payment center 3 is made by telephone.

Conversely in the invention, at the vendor's premises, although the functions performed by the terminal 1 must continue to be fulfilled, this terminal 1 will not be available for payment. Instead of this terminal 1, there will be a simple means available for communication with the payment center 3. This means will be, for example, a microcomputer 13, also provided with a modem, that can be linked by telephone with the payment center 3. As a variant, the terminal 1 is capable of carrying out standard operations with the dispatch of payment messages and, according to the invention, the dispatch of prepayment messages.

In a preferred variant, the payment center 3 will be accessible by Internet. As can be seen hereinafter, this raises no difficulty since the banking operation, with all the security needed for its accomplishment, is not located in the link between the means 13 and the payment center 3. Indeed in the invention, the act of purchasing is dissociated from the act of payment. The act of purchasing needs no security whatsoever. The Internet network is then very suitable. Any system can also be used to send the characteristics of the transaction to the payment center. On the contrary, the act of payment is secured with the method of the invention as shall be seen further below. Consequently, the microcomputer 13 may be that of a private individual, a vendor, who agrees with a purchaser, said purchaser being provided with a mobile telephone and a smart card. For mail order sales, the Internet site of the vendor may propose a screen in which information can be entered by the purchaser on the particulars of the prepayment. In this case, the microcomputer 13 is located in the purchaser's premises. Only the Internet site may be considered to be at the vendor's premises. If need be, the payment center may be host to an Internet payment site according to the invention.

Another essential means of the invention will be a particular mobile telephone 14. This particular mobile telephone 14, whose computer architecture is described in FIG. 2a, may get linked up, firstly, with a SIM security micro-module 15 and, secondly, through an internal reader of the smart card (not shown), with a chip of a smart card 16 of the same type as the smart card 2. As a variant, the smart card 16 is replaced by a chip token or smart token having the same payment role. The term "smart card" herein has a general meaning.

During the payment operation proper, which corresponds to the transaction whose references have been sent by the microcomputer 13 to the payment center 3, the mobile telephone 14 enters into communication with the center 3 by means of a base station 17 connected to selection-switching and conveyance circuits 18 of a mobile telephony operator.

In the invention, the payment center 3 has an interface circuit 19 to implement a particular method of operation of the mobile telephone 14. However, it is possible to do without the circuit 19 and plan to replace the operations that it performs by verbal operations. Indeed, the transaction, the payment operation proper, is performed only between the smart card 16 and the security circuit 15 (or the mobile telephone itself) playing the role of a smart-card reader. This operation is performed, in a telephone call session, for one specific transaction. Consequently, the RF link 20 by which the circuit 15 and the mobile telephone 14 exchange information on the efficient performance of this transaction, while it is preferably done in real time, could be done in deferred time. The particular feature of the invention then lies in the fact that all the critical operations can cope, without any difficulty, with random factors of transmission.

Figure 2A:
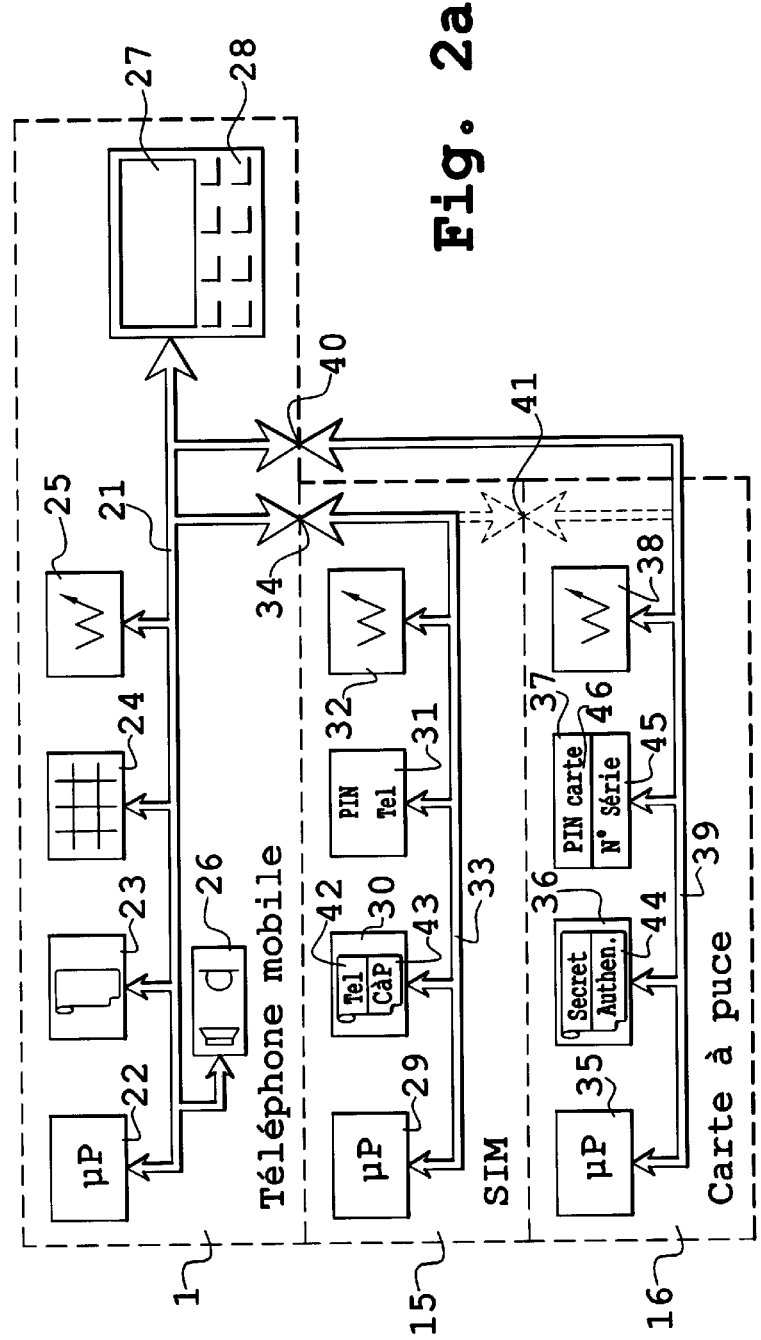
FIGS. 2a and 2b give a schematic view according to the invention of the functional architecture of the mobile telephone in its operation with the SIM security circuit and a smart card, and a request for a payment session sent by a payment center.

FIG. 2a shows the means implemented in the mobile telephone 14. This telephone, in a known way, has a bus 21 connected to a microprocessor 22, a program memory 23, a data memory 24 and a working memory 25. The bus 21 is also connected to speech-processing circuits 26 and to a peripheral consisting of a screen 27 and a keyboard 28. The SIM circuit 15 in the same way has a microprocessor 29, a program memory 30, a data memory 31 and a working memory 32. These elements are connected to one another by a bus 33. The bus 33 is connected to the bus 21 with an interface 34 (in practice a connector to get connected to the chip of the SIM circuit 15). The smart card 16 too has a microprocessor 35, a program memory 36, a data memory 37 and a working memory 38 (more precisely registers in the latter case). In the smart card, these elements are connected to each other by a bus 39. The bus 39 is connected to the bus 21 by an interface 40 of the same type as the interface 34. However the bus 39 could be linked to the bus 33 by an interface 41. These three microprocessor systems work by handing over the initiative to one another. Depending on the operation considered, whether it is the operation of authentication, checking the bearer or certification, any one of these systems will have control over the whole system.

In the invention, the program memory 30 of the SIM circuit 15 has a telephone program 42 responsible for permitting the operation of the mobile telephone by a user. By virtue of this program, this user is, in particular, prompted to key in a telephone PIN code (the code of the telephone) also memorized in the memory 31. The program 42 compares the keyed-in code with the memorized code. The memory 30 furthermore comprises a program 43 capable of converting the mobile telephone into a smart-card payment terminal. This program 43 is a contribution of the invention with respect to the prior art where, in the memory 30, only the program 42 was stored.

The smart card 16 is a standard one. In its program memory 36, it has a standard memory 44 for secret-code verification and authentication (as the case may be). In the data memory 37, a zone 45 visible from the exterior, namely transmissible to the interfaces 40 or 41, comprises information on the card, especially the serial number of the card, as well as the state of certain counters proper to the card, for example an operations counter. A piece of secret information pertaining to the chip is stored in another secret zone 46. The contents of this zone 46 are not accessible on the interfaces 40 or 41 and the physical protection of this zone from fraudulent individuals is particularly reinforced. During exchanges between the smart card 16 and the SIM circuit 15, the bus 39, the bus 33 and the bus 21 may be left available to the microprocessor 29 which, by application of the program 43, manages communication between this smart card and this SIM circuit.

Figure 3:
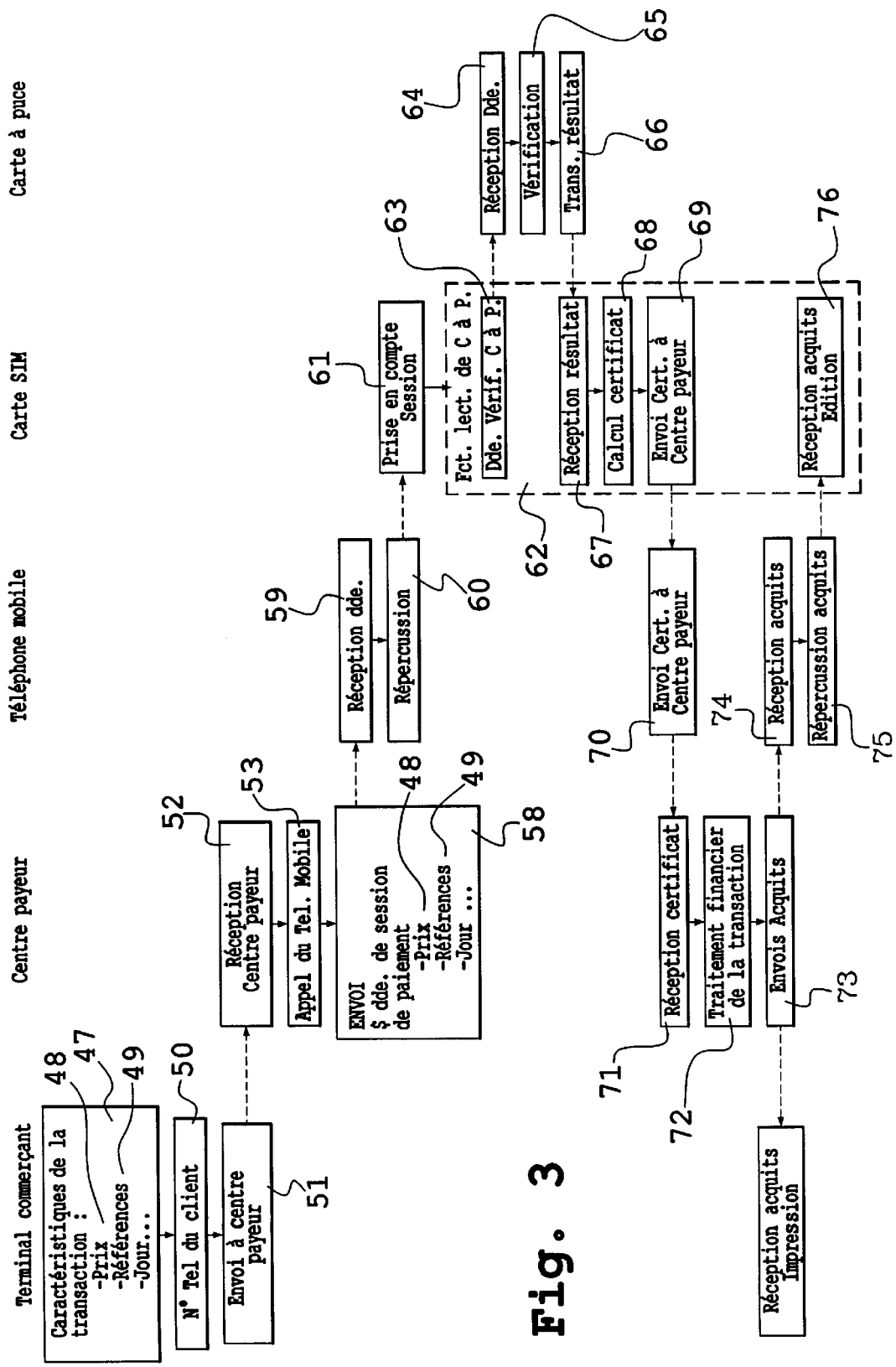
FIG. 3 gives a chronological view of the operations implemented in the different means of FIG. 1 to carry out the payment operation.

In the variant, the payment subprogram corresponding to the subprogram 43 is secured, especially by certification, and its storage is done in the memory 23. In this case, the secured payment protocol may be executed by the microprocessor 22 without the action of the microprocessor 29 of the SIM circuit 15. FIG. 3 shows a more precise view of the different operations that take place in the different systems described hitherto for the efficient execution of a payment operation. However, all these operations, although they are preferably performed in real time, may be separated by waiting periods and some of them may even be postponed to night-time if traffic constraints require it.

The procedure begins by a definition step 47, at the tradesman's premises, of the characteristics of the transaction. The term "tradesman" essentially means a vendor, possibly a private individual especially in the case of an electronic wallet type of transaction. In this case, the smart card 16 could be an electronic wallet type of smart card. The characteristics of the transaction will essentially comprise, as stated here above, firstly a price 48 of the transaction and secondly references 49 of this transaction. The references 49 essentially relate to the tradesman's bank references in a banking organization. The characteristics of the transaction may furthermore include information on the date and time of the transaction as well as certain other information of a legal type (property reservation, conditional payment, etc.). According to the invention, the tradesman will inform the payment center 3 of these characteristics of the transaction. They will be accompanied, in a step 50, by a mobile telephone number of the customer. For example, with his microcomputer 13, the customer or the tradesman will reach an Internet site of the tradesman or the payment center 3. By choosing a option of payment by mobile telephone in this Internet site, he will get a screen before him with zones in which to enter the information 48, 49 and 50 here above.

A step 51 for sending this information to the payment center 3 will take for example the form of a validation of the recording, in this screen, of the keyed-in information. Of this information, some is essential for the invention. This information includes firstly the price 48, secondly the tradesman's bank references 49 and finally the customer's mobile telephone number 50. If information has not been properly entered in these zones, then the program in the payment center 3 will prohibit the validation of the screen, if need be by pointing out the error to be corrected. It is of course possible to do without any Internet session and assume that, in the payment center 3, an operator will verbally ask the vendor to give the information elements 48 to 50. In this case, the payment could, if necessary, entail a cost borne by the vendor. This cost will be invoiced by the payment center as a deduction from the payment.

When, during a step 52, the information elements 48 to 50 are received in the payment center 3, this payment center 3 sends a telephone call 53 to the mobile telephone 1. The call 53 will preferably be a particular type of call. This call will use a particular transmission protocol known as an SMS or short message service. Without going into the details of this type of SMS message, it is enough to know that such messages are provided with a characteristic header 54 (or a tail) and that the microprocessor 22, in reception, is capable of recognizing these messages and processing them as such. In general, a specific processing operation associated with this characteristic header 54 of the SMS message is that it prompts a ringing of the mobile telephone that is different from the normal ringing obtained during a voice call.

Furthermore, these service messages are designed to be stored in the data memory 24 and/or in the data memory 31 of the SIM circuit 15. The header is furthermore followed by the address of that memory, among these memories, where this message has to be stored. In the invention, the address of the SMS message will be the address of the memory 31. To this end, a zone 55 of the SMS message comprises the address 31 (for the memory 31). According to the invention, the nature of the message itself will comprise a sub-header comprehensible to the microprocessor 29 (by virtue of the program 43) to detect the fact that this SMS message is a request for the launching of a payment session. As a variant, the microprocessor 22 carries out this detection.

Figure 2B:
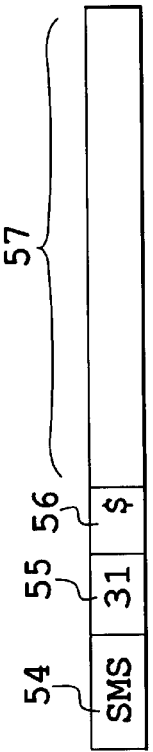

FIG. 2b thus shows that the message comprises the header SMS in the zone 54, the address 31 in the zone 55 and a $ symbol in the zone 56 indicating that a payment session is to be launched. Ultimately, the program 43 comprises a test to ascertain that all the SMS messages that reach the bus 33 have an information element in the zone 56 corresponding to the payment (the $ symbol for example). In a zone 57, the remainder of the SMS message contains certain of the characteristics of the transaction 48 and 49 or others that correspond to it. For example, these characteristics comprise the pricing information 48. However, the reference indication 49 could be replaced by the tradesman's name in non-encrypted form. Indeed, it may be preferable for the user of the mobile telephone to receive, in his mobile telephone, information about the person who is his vendor rather than references of his bank account number, which it is not easy for him to verify. Preferably, the zone 57 will comprise bank information on the tradesman and on the transaction can be used to compute a certificate even if this information is not always displayed.

During a step 58, the payment center 3 therefore uses the interface 19 to send the message of FIG. 2b. This message is received by the mobile telephone after the phone call has been set up by means of the base station 17 and after this message has been demodulated and decoded during a step 59 as an SMS type message. Through the decoding of the zone 54, the SMS message is sent on in a step 60 to the SIM circuit 15 owing to the decoding of the zone 55.

During a subsequent step 61, by the decoding of the zone 56, the SIM circuit 15 (or the mobile telephone itself) acknowledges that this is a payment operation and then puts into operation the sequence corresponding to the program 43 of the memory 30. Thus, the SIM circuit 15 will perform a step 62 of operations during which the SIM circuit 15 will fulfill the functions of a smart-card reader.

As a first operation, the SIM circuit 15 may read the serial number of the smart card 16 and cause it to be immediately transmitted by the mobile telephone 14 to the payment center 3. This center ascertains that the smart card 16 introduced is not a card whose validity has been stopped. As the case may be, it sends a BLACKLISTED CARD type of message which the SIM circuit 15 causes to be displayed on the screen 27.

The functions 62 of a smart-card reader essentially comprise a verification 63 of the fact that the smart card is being carried by its true bearer. In practice, the verification 63 is a request for verification. The verification proper is done by sending this request to the smart card which receives it in a step 64. The smart card then carries out the verification of its bearer during a step 65. In this step 65, the bearer of the mobile telephone (assumed to be the owner of the smart card) is requested to key in the bearer code, in this case the PIN code of the smart card, on the keyboard 28 of the mobile telephone 14. Further below, we shall see the way in which this verification operation can be carried out and practised.

When the verification is carried out to its conclusion, its result is transmitted in an operation 66 to the SIM circuit 15 which still plays the role of the smart-card reader. Thus, at the end of the verification which reports especially that the bearer is an authorized bearer (or at least a bearer knowing the correct secret code of the card), the SIM circuit 15 receives this result during an operation 67, and during an operation 68, it computes a certificate pertaining to the transaction.

The working of the SIM circuit 15 as a smart-card reader makes it necessary for the SIM circuit 15 to take control of the bus 21 and necessitates the display, on the screen 27, of the references of the transaction, especially those relevant here, i.e. chiefly the price and name of the tradesman or vendor. The vendor's name however may be replaced by his bank account number. The certificate is computed on the basis firstly of a serial number of the smart card 16 (communicated during the step 64 or the step 66 to the SIM circuit 15), a count, by a counter, of operations of the smart card, the amount of the transaction as well as any other type of information chosen by the payment center 3.

Once the certificate has been computed during the step 68, it is sent to the payment center 3 during a step 69. The step 69 in fact returns the initiative to the mobile telephone 14 proper so that, in a step 70, it sends an SMS type message to the payment center 3. This type of dispatch is already planned in the normal operation of mobile telephones. However it is not necessary for the operation 69 to be done in real time immediately after the operation 68. It would be possible to act upon the mobile telephone subsequently. When the certificate is sent to the payment center 3, it is received in this center during a step 71 during which the different elements of the payment are taken into account for their financial processing in a step 72.

Once the financial recordings 72 have been done, the payment center 3, in a step 73, sends receipts to both the tradesman and the paying party. The sending of receipts however is not a necessity. It is a preferred solution to reassure both the vendor and the buyer. When sent to the tradesman, the receipt may be in the form of a dispatch of a message in an electronic mail box at the disposal of the tradesman. If need be, the request for an indication of the address of this electronic mail box will be made during the step 51.

With regard to the purchaser, the receipt will be made in the same way as the request for a payment session by the sending of an SMS type message. However, this message will then comprise, in the zone 56, a different piece of information, for example the letter A, to indicate that the receipt information has to be displayed on the screen of the mobile telephone. The reception of the receipts 74 can thus be directly managed by the mobile telephone 14 as a normal function of this mobile telephone. However, it may be preferred to have this receipt passed on, during a step 75, into the SIM circuit 15 which, during an operation 76, brings about the output, on the mobile telephone screen 27, of an information element stating that the transaction has been completed. It is this type of SMS message that makes it necessary to choose that the receipt should be transmitted in deferred mode to the mobile telephone 14. It is then possible, in the latter case, to assume that the payment is validly performed only if the receipt is recorded in the SIM circuit 15.

Indeed, if there are sufficient funds in the purchaser's account, the payment could be rejected. If a different mode of action is desired, then it is possible to prompt a preliminary exchange of information between the payment center 3 and the smart card 16 by means of the telephone 14. This preliminary exchange is placed before the step 63. It consists of the transmission, to the payment center 3, of the references of the smart card 16. The payment center 3 which already knows the amount 48 of the payment gets connected to a database 84 of the payer's bank (whose designation it now knows) to obtain authorization for payment.

As a variant, the payment center will be contained in the tradesman's terminal, namely the vendor's terminal. In practice, the payment center is incorporated in the vendor's terminal. This means for example that the circuits of the payment center 3 are accessible to the terminal 1 by a link which does not use the telephone links. In this variant, the unit constituted by the terminal 1 and payment center 3 of the vendor may itself be a mobile telephone, namely for example it may physically be one and the same machine. In this case, the unit constituted by the terminal 1 and the payment center 3 of the vendor is linked to a smart card, namely the vendor's smart card. In a practical use corresponding to this case, the two smart cards or at least one of them could be electronic wallet type smart cards and the transaction may correspond to an exchange between private individuals. In a use of this kind, the two mobile telephones will exchange a payment message, and the debiting of one electronic wallet will be compensated for by the crediting of the other electronic wallet. The operations 59 to 70 (and 75 and 76) will be performed by the purchaser's mobile telephone while the other operations 47 to 58 and 71 to 73 will be undertaken by the other mobile telephone, namely that of the vendor. In this variant, the terminal 1 comprising the payment center 3 may furthermore be not mobile but in a fixed position.

The payment itself will take place in successive steps corresponding to payment by electronic wallet, the particular feature here being that the two electronic wallets will be connected by an RF channel and that the compensatory functions will be distributed between the two smart-card readers. According to what has been described further above, these functions could be stored in program memories 23, 30 or 36 accessible in each of the mobile telephones.

FIGS. 4a and 4b show operations for verifying secret codes and/or for the authentication of smart-card readers (in this case that of the mobile telephone 14 or the SIM circuit 15) and/or the authentication of smart cards themselves. For example, a smart card sends a smart-card reader, in this case the SIM circuit 15, a random information element as well as its serial number. The SIM circuit 15, in an operation 77, requests the user of the mobile telephone to key in the PIN code of the smart card on the keyboard 28 and combines this PIN code with this random information element by means of an algorithm ALGO1. The result of this enciphering in an operation 79 is sent to the smart card during an operation 80. The smart card then uses its secret information to implement a reverse algorithm, ALGO SMART CARD, during a step 81. As the case may be, the smart card counts the number of attempts and makes them stop at the end of a limited number, for example three attempts. During the operation 81, the smart card, and especially its program, which know firstly the secret information and, secondly, the PIN code information keyed in by the user, is capable of ascertaining that these two information elements correspond or do not correspond to each other. It then sends the result in a string of characters to the SIM circuit 15. This circuit receives this string of characters during a step 82 and deciphers it during a step 83. The algorithm ALGO2 for deciphering the string produced by the algorithm of the smart card leads to the production of the result of the verification, namely that the code and/or card is right or wrong.

Preferably, the smart card will ascertain that the SIM circuit or the mobile telephone is truly a circuit according to the specifications laid down by the payment center 3. To this end, the operations of FIG. 4b will be undertaken once more, possibly with another smart-card algorithm or by the entering of a certification certificate of the program 43 available in the memory 31 instead of the PIN code of the smart card. The certifications comprise especially the taking into account of certain instructions of the program 43 and their encoding by an enciphering algorithm, for example the algorithm ALGO1 or another. The smart card knows what it has to receive as the result of this enciphering by the algorithm ALGO1.

Conversely, the program 43 must be capable of authenticating the fact that the smart card 16 introduced into the smart-card reader of the mobile telephone is a true smart card and not a falsified smart card. In this case, with the smart card, especially on the basis of its serial number, it performs a sequence of operations of the same type through which it ascertains that the smart card is acceptable. The authentication operations are preliminary to the payment session which is constituted in fact by the computation 68 of the payment certificate or payment message.

As an improvement, should the payment center 3 be the vendors bank, this bank sends a payment message by SMS to the mobile telephone 14. This SMS message is an initializing message. During this initializing, the characteristics of the transaction are presented to the bearer of the mobile telephone 14 and this bearer prompts the implementation of the steps 64 to 68. Then, during a return dispatch, an SMS acceptance message is sent back to the payment center 3. Finally, an SMS receipt message is returned to the mobile telephone 14 during the steps 73 to 76. In this context, to further secure the transactions, it is planned to bring into play the circuits 18 of the mobile telephony operator.

Indeed, the SMS messages, in practice, belong to three classes, respectively class 1, class 2 or class 3 depending on whether their contents should lead to a simple display on the screen of the mobile telephone 14 or be transmitted to the SIM circuit 15 or to a mobile telephone memory 14. However much it is true to say that the users have total control over the contents of an SMS message, they do not control the class of the message sent. In particular, they cannot normally give it a class 2 designation. If, despite this prohibition, a user were to do it all the same, the operator has the possibility of blocking the transmission of such messages in his circuits 18.

In the improvement of the invention, it is planned that the payment message sent by SMS by the bank to the mobile telephone 14 will comprise a specific header. This specific header is then recognized by the circuits 18. These circuits 18 assign the SMS initializing message a class 2 designation, which they alone are capable of assigning. This class 2 then causes the message SMS to be processed by the SIM circuit (which is precisely given to the bearer by the mobile telephony operator). This procedure means that, by bringing the mobile telephony operator into play in the process of conveyance of SMS payment messages, it is ensured that no fraudulent individual will be able to simulate the sending of such messages. The circuits 18, instead of recognizing a specific header, may also recognize an origin of the sending of the initializing SMS message. Indeed, it may for example recognize the telephone number corresponding to the line used by the payment center 3 to send its message. Preferably, the SMS acceptance message and the SMS receipt message will be processed in the same way.

What is claimed is:

1. A method of payment comprising the following steps:
   defining the characteristics of a commercial transaction between a vendor and a user or a mobile telephone,
   providing the mobile telephone of the user with a smart-card reader interface,
   transmitting a request for payment, a call number of the customer's mobile telephone an characteristics of the transaction to a payment center through a terminal of the vendor,
   placing a call from the payment center to the mobile telephone,
   causing the mobile telephone to execute a payment session, by action of the payment center when the communication is set up
   launching a secured payment procedure from the mobile telephone with a smart card of the customer inserted into the smart-card reader of the mobile telephone during the payment session.

2. A method according to claim 1, wherein
   the secured procedure is recorded in a secured control circuit and the secured control circuit is made to execute this procedure.

3. A method according to claim 1 wherein, a bearer code of the smart card is checked during the payment procedure.

4. A method according to claim 1, wherein
   because the secured payment procedure is a certified operation, the certification of the secured payment procedure is checked.

5. A method according to claim 1, wherein
   the payment center obtains execution of the payment session by sending an SMS type message.

6. A method according to claim 1, wherein
   the payment procedure comprises a dispatch, by the mobile telephone to the payment center, of a message of agreement to make payment, and a dispatch, in return, by the payment center to the mobile telephone, of a message of reception of this agreement.

7. A method according to claim 1, wherein
   the payment procedure is done in real time.

8. A method according to claim 1, wherein
   the secured payment procedure, prior to the payment session, authenticates the fact that the smart card is a valid and/or authorized smart card.

9. A method according to claim 1, wherein the payment center obtains an authorization of payment with the smart card.

10. A method according to claim 1, wherein
    the smart card is modified so that it can execute a secured payment procedure by telephone.

11. A method according to claim 1, wherein
    the payment center is incorporated into the terminal of the vendor.

12. A method according to claim 1, wherein
    an exchange is prompted between two mobile telephones.

* * * * *